United States Patent
Chatterjee et al.

(10) Patent No.: US 10,094,960 B2
(45) Date of Patent: Oct. 9, 2018

(54) RETROREFLECTIVE SHEETING INCLUDING A LOW ELASTIC MODULUS LAYER

(71) Applicant: 3M INNOVATIVE PROPERTIES COMPANY, St. Paul, MN (US)

(72) Inventors: Reema Chatterjee, Woodbury, MN (US); Jeffrey A. Peterson, North Saint Paul, MN (US); Christopher P. Gerlach, Woodbury, MN (US); David W. Meitz, Saint Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 206 days.

(21) Appl. No.: 14/913,250

(22) PCT Filed: Aug. 13, 2014

(86) PCT No.: PCT/US2014/050798
§ 371 (c)(1),
(2) Date: Feb. 19, 2016

(87) PCT Pub. No.: WO2015/026581
PCT Pub. Date: Feb. 26, 2015

(65) Prior Publication Data
US 2016/0202397 A1    Jul. 14, 2016

Related U.S. Application Data

(60) Provisional application No. 61/867,427, filed on Aug. 19, 2013.

(51) Int. Cl.
*G02B 5/124* (2006.01)
*B29C 35/00* (2006.01)
(Continued)

(52) U.S. Cl.
CPC .............. *G02B 5/124* (2013.01); *B29C 35/00* (2013.01); *G02B 1/04* (2013.01); *B29K 2027/06* (2013.01);
(Continued)

(58) Field of Classification Search
CPC .......... G02B 5/124; G02B 1/04; B29C 35/00; B29K 2027/06; B29K 2033/08; B29K 2069/00; B29K 2075/00; B29L 2011/0083
(Continued)

(56) References Cited

U.S. PATENT DOCUMENTS 3,684,348 A    8/1972    Rowland
3,689,346 A    9/1972    Rowland
(Continued)

FOREIGN PATENT DOCUMENTS

JP    H05-131589         5/1993
JP    2001-254210 A     9/2001
(Continued)

OTHER PUBLICATIONS

Anonymous: "Young's modulus—Wikipedia", Mar. 8, 2017, pp. 1-11, XP055352851, https://en.wikipedia.org/w/index.php?title=Young's_modulus&printable=yes, [retrieved on Mar. 8, 2017].
(Continued)

*Primary Examiner* — James Phan
(74) *Attorney, Agent, or Firm* — Carlos M. Téllez

(57) ABSTRACT

The present application generally relates to retroreflective articles and methods of making retroreflective articles. Some embodiments include a body layer having an elastic modulus of equal to or greater than 1750 MPa, a plurality of truncated cube corner elements, and a polymeric layer between the body layer and the cube corner elements, the polymeric layer having an elastic modulus of less than 1750 MPa.

15 Claims, 1 Drawing Sheet

(51) Int. Cl.
*G02B 1/04* (2006.01)
*B29K 27/06* (2006.01)
*B29K 33/00* (2006.01)
*B29K 69/00* (2006.01)
*B29K 75/00* (2006.01)
*B29L 11/00* (2006.01)

(52) U.S. Cl.
CPC ...... *B29K 2033/08* (2013.01); *B29K 2069/00* (2013.01); *B29K 2075/00* (2013.01); *B29L 2011/0083* (2013.01)

(58) Field of Classification Search
USPC .................................................. 359/529–530
See application file for complete search history.

(56) References Cited

U.S. PATENT DOCUMENTS

| | | | |
|---|---|---|---|
| 3,712,706 A | 1/1973 | Stamm | |
| 3,811,983 A | 5/1974 | Rowland | |
| 4,025,159 A | 5/1977 | McGrath | |
| 4,576,850 A | 3/1986 | Martens | |
| 4,588,258 A | 5/1986 | Hoopman | |
| 4,703,999 A | 11/1987 | Benson | |
| 4,801,193 A | 1/1989 | Martin | |
| 5,171,624 A | 12/1992 | Walter | |
| 5,229,882 A | 7/1993 | Rowland | |
| 5,264,063 A | 11/1993 | Martin | |
| 5,450,235 A | 9/1995 | Smith | |
| 5,691,846 A | 11/1997 | Benson, Jr. | |
| 5,770,124 A * | 6/1998 | Marecki | G02B 5/124 264/1.36 |
| 5,780,140 A | 7/1998 | Nilsen | |
| 5,805,339 A | 9/1998 | Martin | |
| 5,988,820 A | 11/1999 | Huang | |
| 6,258,443 B1 | 7/2001 | Nilsen | |
| 6,325,515 B1 | 12/2001 | Coderre | |
| 6,676,261 B2 | 1/2004 | Mullen | |
| 6,893,731 B2 | 5/2005 | Kausch | |
| 7,185,993 B2 | 3/2007 | Smith | |
| 7,329,447 B2 | 2/2008 | Chirhart | |
| 7,611,251 B2 | 11/2009 | Thakkar | |
| 7,842,374 B2 | 11/2010 | Bacon, Jr. | |
| 7,862,187 B2 | 1/2011 | Thakkar | |
| 8,070,303 B2 | 12/2011 | Luong | |
| 8,114,248 B2 | 2/2012 | Lee | |
| 8,317,341 B2 | 11/2012 | Kim | |
| 2002/0106486 A1 | 8/2002 | Nielsen | |
| 2002/0155276 A1* | 10/2002 | Owusu | B32B 5/18 428/318.8 |
| 2005/0221042 A1 | 10/2005 | Chirhart | |
| 2007/0097295 A1 | 5/2007 | Hebrank | |
| 2009/0029129 A1 | 1/2009 | Pellerite | |
| 2010/0195205 A1 | 8/2010 | Kim | |
| 2010/0265584 A1 | 10/2010 | Coggio | |
| 2011/0019280 A1 | 1/2011 | Lockridge | |
| 2011/0103036 A1 | 5/2011 | Bosl | |
| 2012/0038984 A1 | 2/2012 | Patel | |
| 2013/0034682 A1 | 2/2013 | Free | |
| 2013/0114143 A1 | 5/2013 | Thakkar | |

FOREIGN PATENT DOCUMENTS

| | | |
|---|---|---|
| JP | 4667162 | 1/2011 |
| KR | 2008-0089892 | 10/2008 |
| WO | WO 1995-11464 | 4/1995 |
| WO | WO 2011-091132 | 7/2011 |
| WO | WO 2012-135595 | 10/2012 |
| WO | WO 2012-166448 | 12/2012 |
| WO | WO 2012-166460 | 12/2012 |
| WO | WO 2014-209592 | 12/2014 |

OTHER PUBLICATIONS

International Search Report for PCT International Application No. PCT/US2014/50798, dated Nov. 13, 2014, 3pgs.

* cited by examiner

RETROREFLECTIVE SHEETING INCLUDING A LOW ELASTIC MODULUS LAYER

CROSS REFERENCE TO RELATED APPLICATIONS

This application is a national stage filing under 35 U.S.C. 371 of PCT/US2014/050798, filed Aug. 13, 2014, which claims priority to U.S. Provisional Application No. 61/867,427, filed Aug. 19, 2013, the disclosures of which are incorporated by reference in their entirety herein.

TECHNICAL FIELD

The present application generally relates to retroreflective articles and methods of making retroreflective articles.

BACKGROUND

Retroreflective articles are characterized by the ability to redirect light incident on the material back toward the originating light source. This property has led to the widespread use of retroreflective articles in sheeting used in, for example, traffic and personal safety uses. Retroreflective sheeting is commonly employed in a variety of traffic control articles, for example, road signs, barricades, license plates, pavement markers and marking tape, as well as retroreflective tapes for vehicles and clothing.

Cube corner sheeting, sometimes referred to as prismatic, microprismatic, triple mirror, or total internal reflection sheeting, is one type of retroreflective sheeting. This type of retroreflective sheeting typically includes a multitude of cube corner elements to retroreflect incident light. Retroreflective sheeting typically has a generally planar front surface and an array of cube corner elements protruding from the back surface. Cube corner reflecting elements include generally trihedral structures that have three approximately mutually perpendicular lateral faces meeting in a single corner—a cube corner. In use, the retroreflector is arranged with the front surface disposed generally toward the anticipated location of intended observers and the light source. Light incident on the front surface enters the sheet and passes through the body of the sheet to be reflected by each of the three faces of the elements, so as to exit the front surface in a direction substantially parallel to the light source.

One method of manufacturing such prismatic cube corner sheeting is described in, for example, U.S. Pat. No. 3,689,346 (Rowland) and U.S. Pat. No. 5,691,846 (Benson et al). These patents generally describe methods of continuously replicating cube corner retroreflective articles by depositing a crosslinkable, partially polymerized resin on a negative molding surface to be replicated, and exposing the resin to actinic light or heat to solidify the resin. Because the materials are deposited and then cured, the process is often referred to as "cast and cure." A disadvantage of this manufacturing method is that the resulting sheeting has cube corner elements that exhibit relatively high levels of shrinkage upon solidifying or curing, thus giving rise to optical imperfections in the cube corner microstructure, i.e., changes in the angles between the faces of the cube corner that produce light scattering rather than the desired maximum retroreflectivity. If the angles between faces of a replicated cube corner element cannot be controlled and maintained (e.g., because of shrinkage effects, distortion upon removal from the mold, or distortion due to thermal or mechanical stresses), the efficiency of retroreflection will be materially affected. Even a slight lack of control and maintenance of the cube corner geometry can significantly adversely affect the resultant retroreflective efficiency.

U.S. Pat. No. 5,988,820 (Huang et al) describes high elastic modulus cubes and a low elastic modulus body layer. This combination is advantageous because the sheeting can be highly flexed without suffering from a substantial loss of retroreflectivity. The cube corner elements demonstrate extraordinary dimensional stability during flexing and thereby provide good retroreflective performance when conformed. The dimensional stability and good retroreflective performance can be maintained at high temperatures. However, use of a low elastic modulus body layer will not work in a cast and cure manufacturing process. However, use of a low elastic modulus body layer requires the use of a carrier (e.g., a polyester carrier) to permit cast and cure processing. Without the carrier, the low elastic modulus body layer will stretch too much during the winding and unwinding processes.

U.S. Pat. No. 6,325,515 (Coderre et al) and U.S. Pat. No. 7,329,447 (Chirhart et al) describe a "bilayer" overlay layer including PET and COPET. The overlay layer of this patent protects the underlying optical structures (e.g., cube corner elements) from the environment.

SUMMARY

The inventors of the present application recognized a need for lower cost, flexible retroreflective articles capable of cast and cure processing and having sufficient cube corner element fidelity to form retroreflective articles having the desired brightness (or retroreflectivity). The inventors of the present application recognized that all of these goals could be achieved by forming a retroreflective article including a low elastic modulus polymeric layer between the body layer and the truncated cube corner elements. The polymeric layer has an elastic modulus that is less than 1750 MPa, and the body layer has an elastic modulus of greater than 1750 MPa. The inventors recognized that the inclusion of a polymeric layer having a low elastic modulus absorbs, dissipates, and/or accommodates at least some of the stress forces placed on the article during processing. These stress forces are especially high during cast and cure processing. As a result, cube corner elements with increased fidelity can be formed. Consequently, retroreflective articles including a polymeric layer having a low elastic modulus have increased brightness compared to retroreflective articles lacking the low elastic modulus polymeric layer.

Some embodiments relate to a retroreflective article, comprising: (1) a body layer having an elastic modulus of 1750 MPA or greater; (2) a plurality of truncated cube corner elements; and (3) a polymeric layer between the body layer and the cube corner elements, the polymeric layer having an elastic modulus that is less than 1750 MPa.

Some embodiments relate to a method of forming a retroreflective article, comprising: (1) providing a substrate comprising: (a) a body layer having an elastic modulus of 1750 MPa or greater; and (b) a polymeric layer having an elastic modulus that is less than 1750 MPa; and (2) forming a plurality of truncated cube corner elements on the substrate such that the truncated cube corner elements are adjacent to the polymeric layer. Some embodiments further include forming a specular reflective layer on the plurality of truncated cube corner elements. In some embodiments, the body layer and polymeric layer of the substrate are coextruded. In some embodiments, the body layer and polymeric layer of the substrate are coextruded and bi-axially oriented. In some embodiments, the body layer and the polymeric layer are made by a blown film process.

In some embodiments, the body layer has an elastic modulus of at least 2300 MPa. In some embodiments, the body layer has an elastic modulus of at least 2500 MPa. In some embodiments, the body layer has an elastic modulus of at least 2700 MPa. In some embodiments, the body layer has an elastic modulus of greater than 3000 MPa. In some embodiments, the body layer includes at least one of polyethylene, polypropylene, polymethylmethacrylate, PET (polyethylene terephthalate), polycarbonate, acrylic copolymer, and polyurethane. In some embodiments, the body layer is biaxially oriented. In some embodiments, the body layer has a thickness of between about 20 µm and about 2500 µm.

In some embodiments, the truncated cube corner elements have an average height of between about 1.8 mils (45 µm) and about 2.5 mils (63.5 µm). In some embodiments, adjacent truncated cube corner elements are separated by a land layer. In some embodiments, the truncated cube corner elements are discrete truncated cube corner elements.

In some embodiments, the polymeric layer has an elastic modulus of less than 1750 MPa. In some embodiments, the polymeric layer has an elastic modulus of less than 1500 MPa. In some embodiments, the polymeric layer has an elastic modulus of less than 1300 MPa. In some embodiments, the polymeric layer has an elastic modulus of less than 1100 MPa.

In some embodiments, the polymeric layer includes at least one of a polyethylene, a vinyl, ethylene acrylic acid, or polyurethane. In some embodiments, the polymeric layer includes a biaxially oriented polymer.

In some embodiments, the polymeric layer is amorphous and has a degree of crystallinity of less than 20%. In some embodiments, the polymeric layer has a degree of crystallinity of less than 15%. In some embodiments, the polymeric layer has a degree of crystallinity of less than 10%. In embodiments where an amorphous polymer is present in the polymeric layer, exemplary polymers for use in the polymeric layer include an amorphous copolymer of poly(ethylene terephthalate) and poly(ethylene naphthalene dicarboxylate); poly(ethylene terephthalate) copolyester containing 1,4-cyclohexanedimethanol (PETG copolyester); poly(ethylene naphthalenedicarboxylate) copolyester containing 1,4-cyclohexanedimethanol (PEN copolyester); polycarbonate, poly(vinyl chloride); poly(ethylene-co-acrylic acid); poly(ethylene-co-vinylacetate); polycarbonate; PMMA; amorphous copolyesters (e.g., polyethylene terephthalate glycol (PETG), polycyclohexylendimethylene terephthalate glycol (PCTG), poly(1,4-cyclohexylenedimethylene-1,4-cyclohexane dicarboxylate) (PCCD), isophthalate copolymer, copolyester ether (such as, for example, Eastman NEOSTAR™ elastomers FN005, FN006, and FN007 and ECDEL™ elastomers 9965, 9966, and 9967 (also described in U.S. Patent Publication No. 20090130606144 (Bacon))), 80/20 CoPET (terephthalate/isophthalate), and PET/CoPET (60/40 terephthalic acid/sebacic acid CoPET)). In some embodiments, the polymeric layer does not include a homopolymer of poly(ethylene terephthalate).

In some embodiments, the polymeric layer has a thickness of between about 0.25 µm and about 4 mils (101 µm). In some embodiments, the polymeric layer has a thickness of between about 5 µm and 3 mils (76 µm).

In some embodiments, the polymeric layer and the cube corner elements form an interpenetrating network. In some embodiments, the substantially polymeric layer has a softening point of between about 45° C. and 160° C.

In some embodiments, the article further comprises a pressure sensitive adhesive layer that contacts the discrete truncated cube corner elements, the pressure sensitive adhesive layer comprising at least one discrete barrier layer. In some embodiments, the retroreflective article further includes a specular reflective layer adjacent to the cube corner elements. In some embodiments, the article has a brightness of at least 250 candela/lux/m$^2$. In some embodiments, the retroreflective article is one of a highway signage article, a street signage article, a license plate sheeting, a license plate, a personal safety device, personal safety clothing, a conspicuity article, a vehicle warning article, or a canvas coating article.

BRIEF DESCRIPTION OF DRAWINGS

The figures are not necessarily to scale. Like numbers used in the figures refer to like components. However, it will be understood that the use of a number to refer to a component in a given figure is not intended to limit the component in another figure labeled with the same number.

Figure 1:
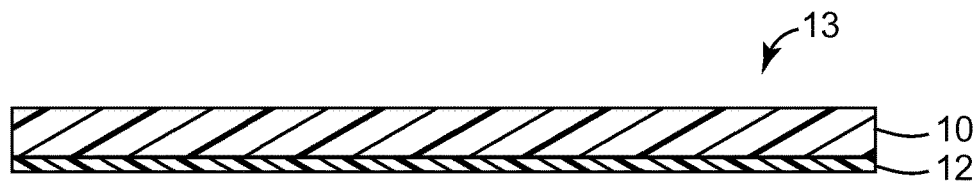
FIG. 1 is a cross-sectional side view of a substrate including a body layer and a low elastic modulus polymeric layer.

In the following detailed description, reference may be made to the accompanying drawing that forms a part hereof and in which is shown by way of illustration one exemplary specific embodiment. It is to be understood that other embodiments are contemplated and may be made without departing from the scope or spirit of the present disclosure.

DETAILED DESCRIPTION

Various embodiments and implementations will be described in detail. These embodiments and implementations should not be construed as limiting the scope of the present application in any manner, and changes and modifications may be made without departing from the spirit and scope of the disclosure. For example, many of the embodiments, implementations, and examples are discussed with specific reference to retroreflective sheeting, but these should not be construed to limit the application scope to this one exemplary implementation. Further, only some end uses have been discussed herein, but end uses not specifically described herein are included within the scope of the present application. As such, the scope of the present application should be determined solely by the claims.

As used herein, "sheeting" refers to a thin piece of polymeric (e.g. synthetic) material. The sheeting may be of any width and length, such dimension only being limited by the equipment (e.g. width of the tool, width of the slot die orifice, etc.) from which the sheeting was made. The thickness of retroreflective sheeting typically ranges from about 0.004 inches (0.1016 mm) to about 0.10 inches (2.54 mm). In some embodiments, the thickness of retroreflective sheeting is less than about 0.012 inches (0.3048 mm). In some embodiments, the thickness of retroreflective sheeting is less than about 0.010 inches (0.254 mm). In the case of retroreflective sheeting, the width is typically at least 12 inches (30 cm). In some embodiments, the width is at least 48 inches (76 cm). In some embodiments, the sheeting is continuous in its length for up to about 50 yards (45.5 m) to 100 yards (91 m) such that the sheeting is provided in a conveniently handled roll-good. Alternatively, however, the sheeting may be manufactured as individual sheets rather than as a roll-good. In such embodiments, the sheets preferably correspond in dimensions to the finished article. For example, the retroreflective sheeting, may have the dimensions of a standard U.S. sign (e.g., 30 inches by 30 inches (76 cm by 76 cm) and thus the microstructured tool employed to prepare the sheeting may have about the same dimensions.

The present disclosure generally relates to retroreflective articles including a polymeric layer having a low elastic modulus between the body layer and the truncated cube corner elements. The polymeric layer having a low elastic modulus absorbs, dissipates, and/or accommodates at least some of the stress forces placed on the retroreflective article during processing. These stress forces are especially high during cast and cure processing. As a result, truncated cube corner elements with increased fidelity can be formed. Consequently, retroreflective articles including a polymeric layer having a low elastic modulus have increased brightness compared to retroreflective articles lacking the low elastic modulus polymeric layer but otherwise made with the same materials and by the same processes.

FIG. 1 is a cross-sectional side view of one exemplary embodiment of the present disclosure in which a substrate 13 includes a body layer 10 and a polymeric layer 12. Polymeric layer 12 has an elastic modulus of less than 1750 MPa.

Figure 2:
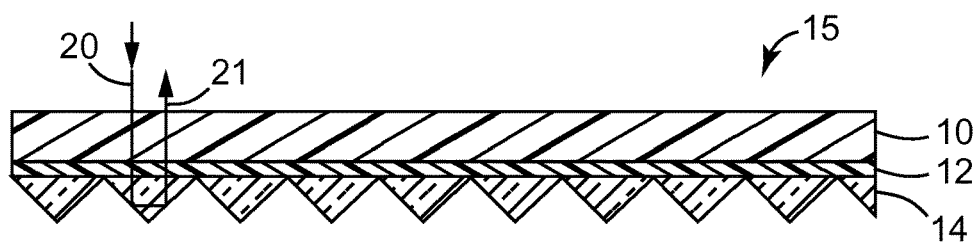
FIG. 2 is a cross-sectional side view of a retroreflective article including the substrate shown in FIG. 1 adjacent to a plurality of truncated cube corner elements.

FIG. 2 is a cross-sectional side view of one exemplary embodiment of the present disclosure in which a retroreflective article 15 includes substrate 13 (of FIG. 1) and a plurality of truncated cube corner elements 14 adjacent to polymeric layer 12. Incoming light (shown by light ray 20) is retroreflected by one of the plurality of cube corner elements, and exits the retroreflective article at approximately the same angle at which it was incident on the article (as shown by light ray 21).

Figure 3:
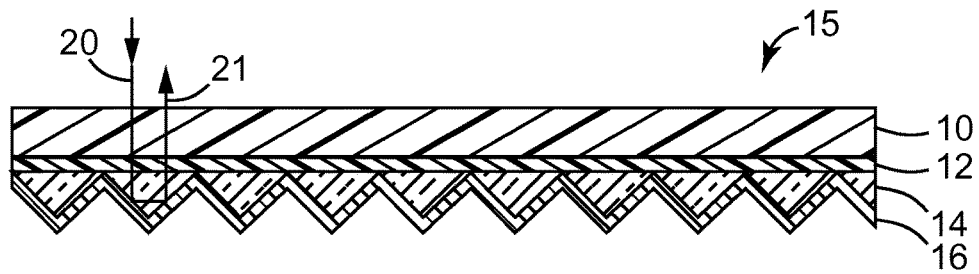
FIG. 3 is a cross-sectional side view of a retroreflective article including the article of FIG. 2 adjacent to a specular reflective layer or coating.

FIG. 3 is a cross-sectional side view of one exemplary embodiment of a retroreflective article 18 in accordance with the present disclosure. Retroreflective article 18 includes body layer 10, polymeric layer 12, a plurality of truncated cube corner elements 14 adjacent to polymeric layer 12, and a specular reflective layer or coating 16 on the plurality of truncated cube corner elements 14. Incoming light (shown by light ray 20) is retroreflected by one of the plurality of cube corner elements, and exits the retroreflective article at approximately the same angle at which it was incident on the article (as shown by light ray 21).

Figure 4:
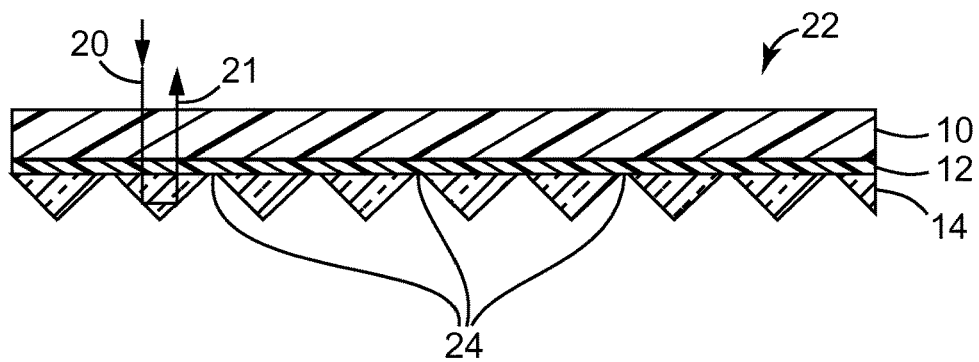
FIG. 4 is a cross-sectional side view of a retroreflective article including the substrate of FIG. 1 adjacent to a plurality of truncated cube corner elements that are separated by a land layer.

FIG. 4 is a cross-sectional side view of a retroreflective article 22. Retroreflective article 22 is substantially the same as retroreflective article 15 of FIG. 2 except that retroreflective article 22 includes a land layer 24 between adjacent cube corner elements 14. In some embodiments, retroreflective article 22 additionally includes a specular reflective layer (not shown).

The term "body layer" typically refers to a material to which the truncated cube corner elements are attached or adjacent. In the present disclosure, where the polymeric layer is part of the body layer, the cube corner elements are attached or directly adjacent to the body layer. Where the polymeric layer is not part of the body layer, the cube corner elements are adjacent (e.g. near) but not attached or directly adjacent to the body layer.

In some embodiments, the body layer has a thickness of between about 20 µm and about 1,000 µm. In some embodiments, the body layer and the truncated cube corner elements include the same material(s). In some embodiments, the body layer is a different material(s) than the truncated cube corner elements. In some embodiments, the body layer includes is one or more light transmitting or transparent polymeric materials. In some embodiments, the body layer may itself include more than one layer. In some embodiments where the body layer includes multiple layers, these layers can include more than one composition, and the composition can vary by layer.

Some exemplary body layers are described in, for example, U.S. Pat. No. 7,611,251 (Thakkar et al), incorporated by reference herein in its entirety. Exemplary materials for use in the body layer include, for example, polyethylene, polypropylene, polymethylmethacrylate, PET (polyethylene terephthalate), polycarbonate, acrylic copolymers, and polyurethane. In some embodiments, the body layer includes a polyolefin. In some embodiments, the body layer includes at least 50 weight percent (wt %) of alkylene units having 2 to 8 carbon atoms (e.g., ethylene and propylene). In some embodiments, the body layer includes a biaxially oriented polymer.

In some embodiments, the body layer is relatively stiff, by which is meant that it has an elastic modulus of 1750 MPa or greater. In some embodiments, the body layer has an elastic modulus of at least 2000 MPa. In some embodiments, the body layer has an elastic modulus of at least 2300 MPa. In some embodiments, the body layer has an elastic modulus of at least 2500 MPa. In some embodiments, the body layer has an elastic modulus of at least 2700 MPa. The term "elastic modulus" means the elastic modulus determined according to the test described in the "Test Methods" section of below for elastic modulus using Atomic Force Microscopy (AFM).

In some embodiments, the body layer includes one or more UV absorbers (also referred to as "UVAs"). UVAs are used in retroreflective sheeting to, for example, protect films containing optical layers from the harmful radiation of the sun in the solar light spectrum (between about 290 nm and 400 nm). Some exemplary UVA materials are described in, for example, U.S. Pat. No. 5,450,235 (Smith et al) and PCT Publication No. 2012/135595 (Meitz et al), both of which are incorporated in their entirety herein.

The articles of the present disclosure include a polymeric layer between the body layer and the truncated cube corner elements. In some embodiments, the polymeric layer is part of the body layer. In some embodiments, the polymeric layer is a separate layer.

The polymeric layer has a low elastic modulus. As used herein, the term "low elastic modulus" or "low elastic modulus polymeric layer" means that the polymeric layer has an elastic modulus of 1750 MPa or less. In some embodiments, the polymeric layer has an elastic modulus of less than 1700 MPa. In some embodiments, the polymeric layer has an elastic modulus of less than 1500 MPa. In some embodiments, the polymeric layer has an elastic modulus of less than 1300 MPa.

Exemplary polymers for use in the polymeric layer include polyurethane water borne dispersions such asNeoRez R600, NeoRez 9660, NeoRez 9060, NeoRezR 9330 available from DSM NeoResins Wilmington Mass.; aliphatic polyester polyurethane such as Alberdingk U 9380, Alberdingk U 9380 available from Alberdingk Boley; permuthane coatings; ethylene co-terpolymer dispersion such as Michem 4983 and Michem 5931 available from Michelman; poly(vinyl chloride); ethylene acrylic acid, ethylene vinyl acetate, copolymer of ethylene with vinyl acetate (EVA), acid- or anhydride-modified EVA, ethylene co-terpolymers, urethane/acrylic copolymer, non-ionic polyester urethane dispersion, acrylic dispersion, polyether, polyamide, ionomeric ethylene copolymer, polyolefin, poly-EPDM (ethylene-propylene-diene), styrene acrylonitrile copolymer, plasticized vinyl halide polymer, ABS copolymer or mixtures thereof). Some additional exemplary materials are acrylic-based polymeric materials (e.g., acrylate or methylacrylate polymers or copolymers, polyethylene glycol diacrylates and hydroxymethyl diacetone acrylamide); and co-polyethylene terephthalate (COPET) copolymers of poly(ethylene terephthalate) and poly(ethylene naphthalene dicarboxylate), poly(ethylene terephthalate) copolyester containing 1,4-cyclohexanedimethanol (PETG copolyester), poly(ethylene naphthalenedicarboxylate) copolyester containing 1,4-cyclohexanedimethanol (PEN copolyester).

In some embodiments, the low elastic modulus polymeric layer includes a substantially amorphous polymer. The degree of crystallinity of a polymer is often used as a measure of the amorphous nature of the polymer. As used herein, the term "substantially amorphous" or "substantially amorphous polymer" refers to polymers where the degree of crystallinity is less than 20%. In some embodiments, the degree of crystallinity is less than 15%. In some embodiments, the degree of crystallinity is less than 10%. Methods for determining the degree of crystallinity are well known, and include, for example, X-ray diffraction. Exemplary polymers for use in the amorphous polymeric layer include an amorphous copolymer of poly(ethylene terephthalate) and poly(ethylene naphthalene dicarboxylate); poly(ethylene terephthalate) copolyester containing 1,4-cyclohexanedimethanol (PETG copolyester); poly(ethylene naphthalenedicarboxylate) copolyester containing 1,4-cyclohexanedimethanol (PEN copolyester); polycarbonate, poly(vinyl chloride); poly(ethylene-co-acrylic acid); poly(ethylene-co-vinylacetate); polycarbonate; PMMA; amorphous copolyesters (e.g., polyethylene terephthalate glycol (PETG), polycyclohexylendimethylene terephthalate glycol (PCTG), poly(1,4-cyclohexylenedimethylene-1,4-cyclohexane dicarboxylate) (PCCD), isophtalate copolymer, and copolyester ether (such as, for example, Eastman NEOSTAR™ elastomers FN005, FN006, and FN007 and ECDEL™ elastomers 9965, 9966, and 9967 (also described in U.S. Patent Publication No. 20090130606144 (Bacon))), 80/20 CoPET (terephthalate/isophthalate), and PET/CoPET (60/40 terephthalic acid/sebacic acid CoPET)). In some embodiments, the amorphous polymeric layer does not include a homopolymer of poly(ethylene terephthalate).

In some embodiments, the polymeric layer has a thickness of between about 0.2 mils (70 nm) and about 4 mils (101 μm). In some embodiments, the substantially polymeric layer has a softening point of between about 45° C. and 160° C. In some embodiments, the substantially polymeric layer has a softening point of between about 75° C. and 150° C. The softening point is measured by Nano thermal analysis with AFM (Atomic Force microscopy) as defined in Anasys Instruments, Nano TA™: Nano Thermal analysis, application note #3, "Multilayer Biaxially Oriented Polypropylene (BOPP) Films", authors: Nicolaas-Alexander Gotzen, Guy Van Assche.

In some embodiments, the polymeric layer forms an interpenetrating network with at least some of the truncated cube corner elements. In some embodiments, when the cube corner element resin composition contacts the polymeric layer, the resin composition penetrates the polymeric layer so that after the primary curing treatment an interpenetrating network between the material of the cube corner elements and the material of the polymeric layer is formed.

The cube corner elements in the present disclosure are truncated cube corner elements. Generally, truncated cube corner elements have the base edges of two adjacent cube corner element arrays substantially coplanar. In some embodiments, truncated cube corner elements include a series of grooves that are formed in the surface of a planar substrate (e.g., metal plate) to form a master mold comprising a plurality of truncated cube corner elements. In one well known technique, three sets of parallel grooves intersect each other at 60 degree included angles to form an array of cube corner elements, each having an equilateral base triangle (see U.S. Pat. No. 3,712,706 (Stamm), incorporated in its entirety herein). In another technique, two sets of grooves intersect each other at an angle greater than 60 degrees and a third set of grooves intersects each of the other two sets at an angle less than 60 degrees to form an array of canted cube corner element matched pairs (see U.S. Pat. No. 4,588,258 (Hoopman), incorporated in its entirety herein). In some embodiments, the truncated cube corner elements have a height of between about 1.8 mils and about 2.5 mils The truncated cube corner elements can include any desired materials, including those described in, for example, U.S. Pat. No. 3,712,706 or 4,588,258, both of which are incorporated in their entirety. Some exemplary materials for use in the discrete truncated cube corner elements include, for example, polymerizable resins. Exemplary polymerizable resins suitable for forming the array of cube corner elements may be blends of photoinitiator and at least one compound bearing an acrylate group. In some embodiments, the resin blend contains a monofunctional, a difunctional, or a polyfunctional compound to ensure formation of a crosslinked polymeric network upon irradiation.

Illustrative examples of resins that are capable of being polymerized by a free radical mechanism that can be used in the embodiments described herein include acrylic-based resins derived from epoxies, polyesters, polyethers, and urethanes, ethylenically unsaturated compounds, isocyanate derivatives having at least one pendant acrylate group, epoxy resins other than acrylated epoxies, and mixtures and combinations thereof. The term "acrylate" is used here to encompass both acrylates and methacrylates. U.S. Pat. No. 4,576,850 (Martens) discloses examples of crosslinked resins that may be used in cube corner element arrays of the present disclosure. Polymerizable resins of the type disclosed in, for example, U.S. Pat. No. 7,611,251 (Thakkar) may be used in cube corner element arrays of the present disclosure.

In some embodiments, the cube corner elements are composite cube corner elements, as described in, for example, PCT Publication No. WO 2012/166460 (Benson et al), incorporated in its entirety herein. Composite truncated cube corner elements include a first resin in a first region of a cube corner element and a second resin in a second region in that cube corner element. Whichever of the first or second resin is directly adjacent to the polymeric layer can be the same or different than the polymeric layer. The plurality of cube corner elements can also be any other type of cube corner element plurality described in PCT Publication No. WO 2012/166460, incorporated in its entirety herein.

In some embodiments, the truncated cube corner elements are discrete cube corner elements that do not have a land portion that fuses or connects individual cube corner elements. Instead, adjacent discrete truncated cube corner elements are separate from one another. This is a term shown in, for example, U.S. Pat. No. 5,691,846 (see FIGS. 6-8 and the related discussion), which is incorporated in its entirety herein.

Some embodiments include a specular reflective coating, such as a metallic coating, on the truncated cube corner elements. These embodiments are often referred to as "metalized retroreflective sheeting." The specular reflective coating can be applied by known techniques such as vapor depositing or chemically depositing a metal such as aluminum, silver, or nickel. A primer layer may be applied to the backside of the cube corner elements to promote the adherence of the specular reflective coating. Additional information about metalized sheeting, including materials used to make metalized sheeting and methods of making it can be found, for example, in U.S. Pat. No. 4,801,193 (Martin) and U.S. Pat. No. 4,703,999 (Benson), both of which are incorporated herein in their entirety.

In some embodiments, a separate overlay film is on the viewing surface of the retroreflective article. The overlay film can assist in providing improved (e.g., outdoor) durability or to provide an image receptive surface. Indicative of such outdoor durability is maintaining sufficient brightness specifications such as called out in ASTM D49560-la after extended durations of weathering (e.g., 1 year, 3 years). In some embodiments, the CAP-Y whiteness is greater than 30 before and after weathering (e.g., 1 year, 3 years).

One or more sealing layers (also referred to, in the singular, as seal film or sealing film or seal layer) may be used on the retroreflective articles of the present application. The sealing layer(s) can include any of the materials mentioned in, for example, U.S. Pat. No. 4,025,159 (McGrath), U.S. Pat. No. 7,611,251 (Thakkar et al), and U.S. Patent Publication No. 2013/114143 (Thakkar et al) all of which are incorporated by reference in their entirety. In some embodiments, the sealing layer(s) is structured, as described in, for example, U.S. Patent Application No. 61/838,562, which is incorporated by reference herein in its entirety.

Some embodiments include a plurality of individual seal legs that extend between the discrete truncated cube corner elements and a multilayer seal film. In some embodiments, these seal legs form one or more cells. A low refractive index material (e.g., a gas, air, aerogel, or an ultra low index material described in, for example, U.S. Patent Publication No. 2010/0265584 (Coggio et al)) can be enclosed in each cell. The presence of the low refractive index material creates a refractive index differential between the discrete truncated cube corner elements and the low refractive index material. This permits total internal reflection at the surfaces of the discrete truncated cube corner elements. In embodiments where air is used as the low refractive index material, the interface between the air and the discrete truncated cube corner elements is often referred to as an air interface.

In some embodiments, the sealing layer is a multilayer film that includes the layers described in, for example, PCT Publication WO 2011/091132 (Dennison et al) (incorporated herein in its entirety) with specific reference to FIG. 2 and related description as the sealing layer, adhesive layer 28, and the release and liner layers 30 and 32. In some embodiments, the multilayer film includes the layers described in WO 2011/091132 with specific reference to film 20 with a sealing layer instead of a receptor layer 22. In such instances, the sealing layer would be on core layer 24, and primer layer 26 is on core layer 24, opposite sealing layer. Multilayer film 20 from WO 2011/091132 additionally includes: an adhesive layer 28 on primer layer 26 opposite core layer 24; release layer 32 on adhesive layer 28 opposite primer layer 26; and liner layer 32 on release layer 30 opposite adhesive layer 28. The multilayer film can generally be separated along the interface between adhesive layer 28 and release layer 30.

In some embodiments, the retroreflective sheeting lacks either sealing films and/or a specular reflective or metal coating on the cube corner elements. Exemplary sheeting constructions are described in, for example, in U.S. Patent Publication No. 2013/0034682 (Free et al), incorporated herein in its entirety. In these embodiments, the retroreflective sheeting comprises optically active areas in which incident light is retroreflected by a structured surface including, for example, cube corner elements, and one or more optically inactive areas in which incident light is not substantially retroreflected by the structured surface. The one or more optically active areas include a low refractive index layer or material adjacent to a portion of the structured surface. The one or more optically inactive areas include a pressure sensitive adhesive adjacent to a portion of the structured surface. The pressure sensitive adhesive substantially destroys the retroreflectivity of the portions of the structured surface that are directly adjacent thereto. The low refractive index layer assists in maintaining the retroreflectivity of the adjacent structured surface by forming a "barrier" between the structured surface and the pressure sensitive adhesive. In some embodiments, the retroreflective sheeting includes a barrier layer between the pressure sensitive adhesive and the low refractive index layer. The barrier layer has sufficient structural integrity to substantially prevent flow of the pressure sensitive adhesive into the low refractive index layer. Exemplary materials for the barrier layer include resins, polymeric materials, inks, dyes, and vinyls. In some embodiments, the barrier layer traps a low refractive index material in the low refractive index layer. Low refractive index materials are materials that have an index of refraction that is less than 1.3 (e.g., air and low index materials (e.g., low refractive index materials described in U.S. Patent Publication No. 2012/0038984 (Patel et al), which is hereby incorporated herein in its entirety). In some embodiments, the retroreflective sheeting includes a pressure sensitive adhesive layer that contacts at least some of the discrete truncated cube corner elements. The pressure sensitive adhesive layer comprises at least one discrete barrier layer. In some embodiments, the pressure sensitive adhesive comprises a plurality of discrete barrier layers.

Various methods may be used to form the retroreflective articles described above. Some methods involve: (1) providing a substrate comprising: (a) a body layer; and (b) a polymeric layer including a low elastic modulus polymeric layer; and (2) forming a plurality of truncated cube corner elements on the polymeric layer of the substrate. In some embodiments, these methods involve cast and cure processing, as is described in, for example, U.S. Pat. No. 3,689,346 (Rowland) and U.S. Pat. No. 5,691,846 (Benson), both of which are incorporated in their entirety herein. In some embodiments, the body layer and polymeric layer of the substrate are coextruded. In some embodiments, the body layer and polymeric layer of the substrate are coextruded and biaxially oriented. In some embodiments, the body layer and the polymeric layer are made using a blown film process. In other embodiments, the polymeric layer is coated onto the body layer.

Some methods further include forming a specular reflective coating on the truncated cube corner elements. The specular reflective coating can be applied by known techniques such as vapor depositing or chemically depositing a metal. Additional details about such methods are provided in, for example, U.S. Pat. No. 4,801,193 (Martin) and U.S. Pat. No. 4,703,999 (Benson), both of which are incorporated herein in their entirety. Alternatively, some methods include using a sealing layer in lieu of the specular reflective coating or using a pressure sensitive adhesive layer comprising discrete barrier materials.

The retroreflective articles of the present disclosure have many uses. Some exemplary uses include highway or street signage articles, license plate sheeting, personal safety devices, personal safety clothing, conspicuity applications, vehicle warning, canvas coatings, and the like. In some embodiments, the retroreflective article is one of a highway signage article, a street signage article, a license plate sheeting, a license plate, a personal safety device, personal safety clothing, a conspicuity article, a vehicle warning article, or a canvas coating article. Where the retroreflective article is used as sheeting, some exemplary substrates to which the retroreflective sheeting can be adhered include, for example, wood, aluminum sheeting, galvanized steel, polymeric materials (e.g., polymethyl methacrylates, polyesters, polyamids, polyvinyl fluorides, polycarbonates, polyvinyl chlorides, polyurethanes), and a wide variety of laminates made from these and other materials.

The retroreflective articles of the present disclosure have various advantages and/or benefits. For example, many embodiments of the retroreflective articles exhibit excellent flexibility. In at least some embodiments, the articles are bendable but not extensible. This flexibility is especially desirable for certain retroreflective sheeting applications, including, for example, barrel wrapping, truck conspicuity, and the like. Additionally, some embodiments of the retroreflective articles of the present disclosure are mechanically durable in terms of their ability to recover from repeated or extended periods of severe distortion and/or distortional flex while, at the same time, are capable of maintaining superior optical properties as defined by efficiency of retroreflection and superior appearance. Also, the retroreflective articles are able to withstand long term exposure to wear and weathering without significant degradation of optical properties or retroreflective brightness. Some articles have a brightness of at least 250 candela/lux/m$^2$.

The following examples describe some exemplary constructions of various embodiments of the retroreflective articles and methods of making the retroreflective articles described in the present application. The following examples are intended to be illustrative, but are not intended to limit the scope of the present application.

EXAMPLES

Materials

The following materials were used in the preparation of Comparative Examples A-B and Examples 1-4.

| TRADE DESIGNATION | MATERIAL | SUPPLIER |
| --- | --- | --- |
| CX100 | Polyfunctional aziridine crosslinker | DSM NeoResins, Wilmington, MA |
| CYMEL 327 | Aminoresin crosslinker | Cytec |
| DAROCURE 1173 | Photoinitiator | BASF, Florham Park, NJ |
| EASY WET 20 | COMPLETE | COMPLETE |
| EBERCRYL 3720 | Bisphenol A epoxy diacrylate | Cytec |
| HDDA | 1,6 hexanediol diacrylate | Cytec |
| IRGANOX 1035 | Antioxidant | BASF |
| LUCIRIN TPO | Photoioitiator | BASF |
| MICHEM PRIME 4983R | Ethylene acrylic acid dispersion | Michelman, Cincinnati, OH |
| MICHEM PRIME 5931 | Modified ethylene acrylic acid dispersion | Michelman |
| NEOREZ R600 | Polyurethane dispersion | DSM NeoResins |
| PEA | poly(ethyl acrylate) | Sartomer |
| PHOTOMER 6210 | Aliphatic urethane diacrylate | IGM Resins, St. Charles, IL |
| PS BEADS | Polystyrene beads having an average diameter of about 0.4 mm | 3M Company, St. Paul, MN |
| RHOPLEX 3208 | Acrylate/melamine-formaldehyde dispersion | Rohm and Haas Co (Philadelphia, PA) |
| SR 602 | Ethoxylated (10) bisphenol-A diacrylate | Sartomer Company, Exton, PA |
| SR 601 | Ethoxylated (4) bisphenol-A diacrylate | Sartomer |
| TOMADOL 25-9 | Nonionic surfactant | Air Products, Allentown, PA |
| TMTPA | Trimethylol propane triacrylate | Cytec |
| TRITON X-100 | Surfactant | Dow Company, Midland, MI |
| UVA 1164 | UV absorber | Cytec |

Test Methods

Coefficient of Retroreflection (Brightness) ($R_A$):

brightness was measured using a retroreflectometer (Retrosign GR3, commercially available from DELTA Danish Electronics, Light & Acoustics, Denmark) generally using the method described in ASTM E810-03, "Standard Test Method for Coefficient of Retroreflection of Retroreflective Sheeting Utilizing the Coplanar Geometry". Results are reported in cd/lux.m$^2$.

Thickness and Elastic Modulus:

layer thickness and elastic modulus measurements of cross-sections of the retroreflective sheeting were done using Atomic Force Microscopy (AFM). Reflective sheeting of Comparative Examples A-B and Examples 1-4 was cut into 3 by 5 mm rectangular samples and mounted into a metal vice exposing the film edge to be analyzed. The sample edge was microtomed with a Leica UC7 Ultramicrotome using a Diatome diamond edge knife providing fairly flat and smooth cross-sections, exposing all the layers in the sheeting. A Bruker Icon AFM with Peak Force Quantitative Nano Mechanical Technology (PF QNM) was used for imaging the layers. The force curves in PF QNM were generated at 2K Hertz keeping the tip in the vertical direction. The Elastic Modulus was obtained using the Derjaguin-Muller-Toporov (DMT) model. Image processing and data analysis were done with the accompanying software. The images were analyzed using the section feature of the software that allows for a single line of data or a rotation box that allows for multiple lines of data to be averaged in the y direction of the image. The elastic modulus data was obtained using the rotating box feature of the section analysis in the DMT modulus image. Thickness was determined using both the height and DMT modulus images. The thickness is reported in microns (μm) and modulus in MPa.

Polymeric Layer Compositions 1-4

Polymeric Layer Compositions 1-4 were prepared by mixing the resins listed in Table 1, below, with deionized (DI) water at room temperature using a magnetic stirrer. A surfactant was slowly added to the solution and allowed to mix for 5 minutes. A crosslinker was then slowly added to the mixture and stirred for 5 minutes. Additional components (if used) were subsequently added and stirred for 5 minutes. Components used in Polymeric Layer Compositions 1-4 are shown in Table 1, below. The amounts are expressed in weight percent (wt %).

TABLE 1

| Polymeric Layer Composition | Resin (wt %) | Crosslinker (wt %) | Slip agent (wt %) | Surfactant (wt %) |
| --- | --- | --- | --- | --- |
| Polymeric Layer Composition 1 | MICHEM PRIME 5931 (13.4) | CX-100 (1.49) | None | Easy-Wet 20 (0.1) |
| Polymeric Layer Composition 2 | MICHEM PRIME 4983R (13.6) | CX-100 (1.34) | None | Easy-Wet 20 (0.1) |
| Polymeric Layer Composition 3 | NEOREZ R 600 (11.9) | CX-100 (3.0) | None | Easy-Wet 20 (0.1) |
| Polymeric Layer Composition 4 | NEOREZ R 600 (12.7) | CX-100 (3.2) | PS Beads (0.1) | Easy-Wet 20 (0.1) |

Comparative Example A

A retroreflective article was prepared by casting cube corner elements onto a body layer and subsequently curing the cube corner elements, as generally described in U.S. Pat. No. 7,862,187 (Thakkar et al), the disclosure of which is incorporated herein by reference in its entirety. Comparative Example A was prepared as generally described in Comparative Example B of U.S. Pat. No. 7,862,187, with the exception that a crystalline polyethylene terephthalate (PET) body layer was used. The body layer was prepared by extruding pellets of PET mixed with 1 wt % of UV 1164, and biaxially stretching (tentering) the extruded film to crystallize the PET. The PET body layer was corona treated on one side at 1 J to provide a body layer approximately 50 μm thick.

Cube corner elements were cast onto the corona treated side of the PET body layer using a cube corner resin comprising: 25 wt % bisphenol A epoxy diacrylate (EBECRYL 3720), 50 wt % TMPTA, 25 wt % HDDA, 0.5 pph LUCIRIN TPO and 0.5 pph DAROCURE 1173. The cube corner elements were cured as described in Comparative Example B of U.S. Pat. No. 7,862,187.

Comparative Example B

A retroreflective article was prepared as described in Comparative Example A, except that the body layer further included a primer composition coated onto one side of the PET body layer, as generally described in, for example, U.S. Pat. No. 6,893,731, and U.S. Patent Publication Nos. 2009/0029129; 2011/0019280 (see, e.g., [0038]), and 2011/0103036 (see. e.g., [0102]), all of which are incorporated herein by reference. The primer layer comprised a mixture of 6 wt % of RHOPLEX 3208, 0.6 wt % of CYMEL 327, 0.1 wt % of CYCAT 4045, 0.1 wt % of TOMADOL 25-9 and 0.1 wt % of PS BEADS.

Examples 1-4

Retroreflective articles were prepared as described in Comparative Example A, except that a polymeric layer having an elastic modulus greater than 2000 MPa was provided between the cube corner elements and the body layer. PET body layers prepared as generally described in Comparative Example A were coated with, respectively, Polymeric Layer Compositions 1-4 using Meyer rods or online gravure coater to provide different coating thicknesses. The coated films were then stretched (tentered) in the cross-web direction, and cured at temperatures of about 230-260° C. Coating methods used in Examples 1-4 are shown in Table 2, below.

TABLE 2

| Examples | Coating Method |
| --- | --- |
| Example 1 | #16 Meyer Rod |
| Example 2 | #16 Meyer Rod |
| Example 3 | #16 Meyer Rod |
| Example 4 | Gravure coater |

Elastic moduli and thicknesses of the body layers and polymeric layers of Comparative Examples A-B and Examples 1-4 were measured using the test methods described above. Results are reported in Table 3, below, wherein N/M stands for not measurable. Particularly, the primer layer of Comparative Example B was too thin and its thickness not measurable. In addition, the coefficient of retroreflection of Comparative Examples A-B and Examples 1-4 was measured at an observation angle of 0.2° and entrance angle of −4°, as described above. Results are also reported in Table 3, below.

TABLE 3

| | Elastic Modulus (MPa) | | Thickness of polymeric layer (μm) | $R_A$ (cd/lux · m$^2$) |
| --- | --- | --- | --- | --- |
| Examples | Body layer | Polymeric Layer | | |
| Comparative Example A | 3000 | 0 | None | 207 |
| Comparative Example B | 2600 | N/M | N/M | 200 |
| Example 1 | 2500 | 1000 | 2.1 | 458 |
| Example 2 | 2000 | 900 | 2.0 | 490 |
| Example 3 | 2200 | 1500 | 2.0 | 321 |

TABLE 3-continued

| Examples | Elastic Modulus (MPa) | | Thickness of polymeric layer (μm) | $R_A$ (cd/lux · m²) |
|---|---|---|---|---|
| | Body layer | Polymeric Layer | | |
| Example 4 | 3100 | 1200 | 0.27 | 250 |

Comparative Example C and Examples 5-6

A retroreflective article was prepared as generally described in Example 4 of PCT Publication No. WO 2012/166448 (Spurgeon et al) (incorporated herein by reference), except that (i) the PET body layer of Comparative Example A of the present application was used, and (ii) first and second compositions used in the composite cube corner elements are shown in Table 4, below. As taught in WO 2012/166448, the first composition was used to partially fill cube corner cavities in the mold (i.e., form the apex of the cube corner elements). The second composition was used to completely fill the partially filled cavities, forming the base of the cube corner elements. In Comparative Example C, the same resin was used as the first and second compositions. In Examples 5 and 6, a resin comprising a polymer with lower elastic modulus was used as the second (i.e., base forming) resin composition. Ingredients for the resin compositions used in Comparative Example C and Examples 5-6 are shown in Table 4, below. Amounts are expressed in weight percent (wt %).

TABLE 4

| Ingredients | Resin Composition 1 (wt %) | Resin Composition 2 (wt %) | Resin Composition 3 (wt %) |
|---|---|---|---|
| EBERCRYL 3720 | 25 | 0 | 0 |
| HDDA | 25 | 0 | 25 |
| PEA | 0 | 8 | 0 |
| TMPTA | 50 | 8 | 0 |
| SR602 | 0 | 20 | 0 |
| SR601 | 0 | 4 | 0 |
| DAROCURE 1173 | 0.50 | 0.35 | 1 |
| PHOTOMER 6210 | 0 | 60 | 75 |
| LUCIRIN TPO | 0.50 | 0.10 | 0 |
| IRGANOX 1035 | 0 | 0.20 | 0 |

Resin compositions used in Comparative Example C and Examples 5-6 are shown in Table 5, below, wherein modulus data is storage modulus at 25° C. In addition, the coefficient of retroreflection of Comparative Example C and Examples 5-6 was measured at an observation angle of 0.2° and entrance angle of −4°, as described above. Results are also reported in Table 5.

TABLE 5

| Examples | First Resin | | Second Resin | | $R_A$ (cd/lux · m²) |
|---|---|---|---|---|---|
| | Composition | Modulus (MPa) | Composition | Modulus (MPa) | |
| Comp. Ex. C | Resin Composition 1 | 1770 | Resin Composition 1 | 1770 | 177 |
| Example 5 | Resin Composition 1 | 1770 | Resin Composition 2 | 1114 | 229 |
| Example 6 | Resin Composition 1 | 1770 | Resin Composition 3 | 466 | 261 |

All references mentioned herein are incorporated by reference in their entirety.

As used herein, the words "on" and "adjacent" cover both a layer being directly on and indirectly on something, with other layers possibly being located therebetween.

As used herein, the terms "major surface" and "major surfaces" refer to the surface(s) with the largest surface area on a three-dimensional shape having three sets of opposing surfaces.

Unless otherwise indicated, all numbers expressing feature sizes, amounts, and physical properties used in the present disclosure and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. All numerical ranges are inclusive of their endpoints and non-integral values between the endpoints unless otherwise stated.

As used in this specification and the appended claims, the singular forms "a", "an", and "the" encompass embodiments having plural referents, unless the content clearly dictates otherwise.

As used in this disclosure and the appended claims, the term "or" is generally employed in its sense including "and/or" unless the content clearly dictates otherwise.

The phrases "at least one of" and "comprises at least one of" followed by a list refers to any one of the items in the list and any combination of two or more items in the list.

Various embodiments and implementation of the present disclosure are disclosed. The disclosed embodiments are presented for purposes of illustration and not limitation. The implementations described above and other implementations are within the scope of the following claims. One skilled in the art will appreciate that the present disclosure can be practiced with embodiments and implementations other than those disclosed. Those having skill in the art will appreciate that many changes may be made to the details of the above-described embodiments and implementations without departing from the underlying principles thereof. It should be understood that this invention is not intended to be unduly limited by the illustrative embodiments and examples set forth herein and that such examples and embodiments are presented by way of example only with the scope of the invention intended to be limited only by the claims set forth herein as follows. Further, various modifications and alterations of the present disclosure will become apparent to those skilled in the art without departing from the spirit and scope of the present disclosure. The scope of the present application should, therefore, be determined only by the following claims.

What is claimed is:

1. A retroreflective article, comprising:
    a body layer comprising at least one of polymethylmethacrylate, PET (polyethylene terephthalate), polycarbonate, acrylic copolymers, and polyurethane, and having an elastic modulus of 1750 MPa or greater;
a plurality of truncated cube corner elements; and
a polymeric layer between the body layer and the cube corner elements, the polymeric layer having an elastic modulus that is less than 1750 MPa.

2. The retroreflective article of claim 1, wherein the body layer has an elastic modulus of at least 3500 MPa.

3. The retroreflective article of claim 1, wherein the body layer is biaxially oriented and includes at least one of polyethylene, polypropylene, polymethylmethacrylate, PET (polyethylene terephthalate), polycarbonate, acrylic copolymers, and polyurethane.

4. The retroreflective article of claim 1, wherein the body layer has a thickness of between about 20 μm and about 1000 μm and the polymeric layer has a thickness of between about 0.2 mils and about 4 mils.

5. The retroreflective article of claim 1, wherein the polymeric layer has an elastic modulus of less than 1500 MPa.

6. The retroreflective article of claim 1, wherein the polymeric layer includes at least one of copolymers of poly(ethylene terephthalate) and poly(ethylene naphthalene dicarboxylate), poly(ethylene terephthalate) copolyester containing 1,4-cyclohexanedimethanol (PETG copolyester), poly(ethylene naphthalenedicarboxylate) copolyester containing 1,4-cyclohexanedimethanol (PEN copolyester), 80:20 terephthalate/isopthalate CoPET, polycarbonate, poly(vinyl chloride), ethylene acrylic acid, ethylene vinyl acetate, polyurethane, UV-cured acrylate or UV-cured epoxy acrylate polymers, or dispersions thereof.

7. The retroreflective article of claim 1, further comprising a pressure sensitive adhesive layer that contacts the discrete truncated cube corner elements, the pressure sensitive adhesive layer comprising at least one discrete barrier layer.

8. The retroreflective article of claim 1, further comprising:
a specular reflective layer adjacent to the cube corner elements.

9. The retroreflective article of claim 1, wherein the article has a brightness of at least 250 candela/lux/m$^2$.

10. The retroreflective article of claim 1, wherein the retroreflective article is one of retroreflective sheeting, a highway signage article, a street signage article, a license plate sheeting, a license plate, a personal safety device, personal safety clothing, a conspicuity article, a vehicle warning article, or a canvas coating article.

11. The retroreflective article of claim 1, wherein the polymeric layer has a degree of crystallinity of less than 15%.

12. The retroreflective article of claim 1, wherein the polymeric layer and the cube corner elements form an interpenetrating network.

13. The retroreflective article of claim 1, wherein the polymeric layer has a softening point of between about 45° C. and 160° C.

14. A method of forming the retroreflective article of claim 1, comprising:
providing a substrate comprising:
(a) the body layer having an elastic modulus of 1750 MPa or greater; and
(b) the polymeric layer having an elastic modulus that is less than 1750 MPa;
forming the plurality of truncated cube corner elements on the polymeric layer of the substrate.

15. The method of claim 14, further comprising:
curing the retroreflective article.

* * * * *